A. M. Black,

Steam Fire Engine.

No. 101,814. Patented Apr. 12, 1870.

Witnesses
Phil. R. Larner
Frank A. Jackson

Inventor:
Arthur M. Black.
By Wm. C. Wood
Attorney

UNITED STATES PATENT OFFICE.

ARTHUR M. BLACK, OF PROVIDENCE, RHODE ISLAND.

IMPROVEMENT IN AUTOMATIC RELIEF-VALVES.

Specification forming part of Letters Patent No. 101,814, dated April 12, 1870.

*To all whom it may concern:*

Be it known that I, ARTHUR M. BLACK, of the city and county of Providence and State of Rhode Island, have invented a certain new and useful Automatic Relief-Valve adapted for attachment to and use with steam-pumps, &c.

My invention consists in the combination of a pressure-chamber containing a piston and rod or their equivalent, made adjustable by springs or similar means, so that the piston will yield at any stated degree of pressure with any suitable valve, also provided with springs or similar appliances so applied to the valve that it will close or open at any stated degree of pressure therein, the two being placed in proper relation to each other and connected by mechanism in such a manner that a certain desired degree of pressure in the said pressure-chamber shall, by the said pressure upon the piston or its equivalent, cause or permit, by the connecting mechanism, the intermediate valve to promptly open by reason of the pressure of the water within, thereby affording prompt relief to any undue pressure within the chamber of any pump or other apparatus to which it may be attached; and I do hereby declare that the following specification, taken in connection with the drawings furnished and forming a part of the same, is a true, clear, and exact description thereof.

Figure 1:
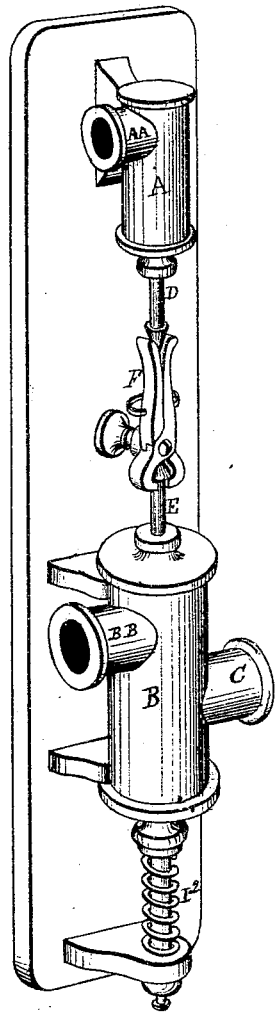

Reference being had to the drawings, Figure 1 represents one of my automatic relief-valves complete. A represents the pressure-chamber. A A is the inlet thereto through which the water enters. B represents the relief-valve proper. B B is the inlet thereto through which the water enters. It is here to be understood that these inlets A A and B B may be attached to the base of the so-called "air-chamber" of the pump; or they may be attached to any pipe properly connected therewith. Water under pressure enters both inlets alike. D is the piston-rod of the pressure-chamber. E is the valve-rod of the relief-valve. Both of these rods D and E are provided with springs capable of adjustment to resist various degrees of pressure. The piston-rod D is provided with a pointed outer or lower end. The valve-rod E is provided with a shouldered upper or outer end. F is a spring-clamp, in the form of a pair of cut nippers, arranged between the ends of the piston-rod D and valve-rod E. It is arranged so as to remain closed except under certain circumstances. The pointed end of the rod D is arranged to fill a wedge-formed space between the upper ends of the handles of the clamp. The lower ends or beaks of the clamp are made to embrace the shouldered end of the valve-rod. C is the outlet or "relief" pipe of the valve.

Figure 2:
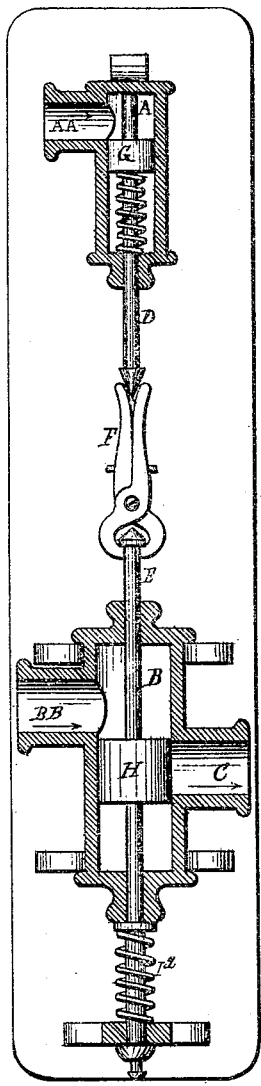

Fig. 2 represents in vertical section the same as in Fig. 1, and more fully represents the operative mechanism, the interior of the pressure-chamber, and valve, the various parts being in their regular relative positions, as if under a slight pressure. G is a piston attached to the rod D in the pressure-chamber A. H is a piston attached to the rod E in the valve. I' and I² are springs capable of such adjustment as will keep the piston elevated to the positions shown in the figure and to cause them to resist any degree of pressure to which they may be adjusted.

Figure 3:
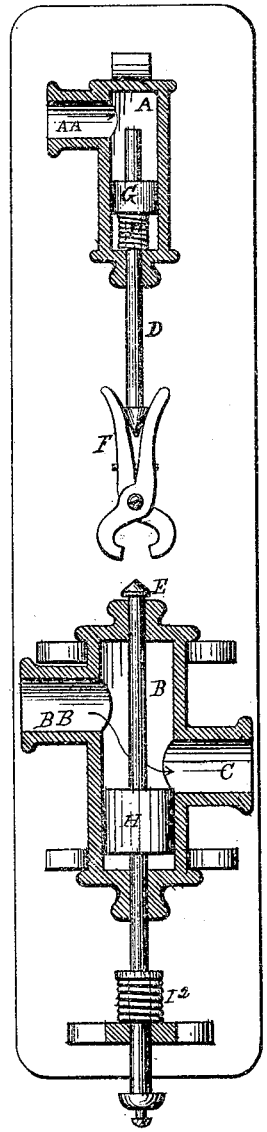

Fig. 3 represents the same as in Fig. 2, but showing the relative position of the parts of the operative mechanism under a greater degree of pressure than is desired. Parts are lettered as in Figs. 1 and 2.

The operation of my relief-valve is as follows: Let us suppose, by way of illustration, that the inlet-pipes A A and B B were attached to the so-called "air-chamber" of a steam fire-engine; that the outlet-pipe C opened outward entirely, or that it was connected by means of a pipe with the suction-chamber below the pumps. Let us further suppose that the hose being used with this engine was only capable of withstanding a pressure of one hundred and fifty pounds per square inch. The spring I' in pressure-chamber A would therefore be adjusted to resist a pressure of, say, one hundred and forty pounds per square inch and the spring I² set to resist a pressure of, say, one hundred and twenty-five pounds per square inch. The fire-engine being in operation with water at one hundred pounds per square inch, let us suppose the hosemen at the end of the line of hose to have the means of cutting off the flow of water at the hose-pipe, and that they do so cut it off. The result is that a greater degree of pressure is produced within the pump-chamber of the engine. The spring I' of chamber A, upon receiving a pressure of one hundred and forty pounds per inch, descends with the rod D, which spreads apart or opens the clamp F, which releases the valve-rod E and permits it to quickly fall, thereby opening the passage of the water under pressure via outlet C to the suction-chamber of the pump, to circulate through and through the engine without increasing the pressure or requiring the stoppage of the pump. Should the hoseman open his cut-off and allow the water to flow through the nozzle, the pressure is relieved, the piston G, with its rod D, resumes its position in the chamber A, the clamp F returns to its closed position, and as the pressure decreases to less than one hundred and twenty-five pounds per inch the valve-piston H ascends under pressure of spring $I^2$, cutting off the outlet C, the upper end of the valve-rod coming again in proper relation to the clamp F, which securely holds it until it becomes necessary to repeat the operation described.

It will be obvious that a great variety of mechanical appliances can be employed to effect the means of connection between the pressure-chamber and relief-valve. I have myself devised a variety of such, and could devise many more, but prefer that herein shown and described to any other, for reason of its complete simplicity and effectiveness.

The value of my invention will be readily admitted when by its use the hoseman may enter a building on fire with the water cut off at the hose-pipe, approach the fire, let on the water, and when it is no longer needed cut it off and retire with his path as dry as it was before he entered. By its use an excess of water at such partial conflagrations will cease to occasion greater damage than that which commonly results from the fire itself.

I am aware that in so-called "water-regulators" pressure-chambers capable of adjustment to resist a certain degree of pressure have been constructed and so connected with valves as to secure a uniform flow of water under various degrees of head or pressure.

I am also aware that certain devices for regulating draft in the fire-beds of steam-boilers and for relieving steam-boilers after the manner of safety-valves have been constructed in large numbers, in which pressure-chambers have been connected with dampers or valves, by which a slow and gradual opening or closing of the dampers or valves was effected. I am not aware, however, that before my invention a pressure-chamber and a valve were ever connected, both being adjustable to resist any desired degree of pressure, and so arranged that the water-valve should be made or permitted to open instantaneously and afford immediate relief, and also so arranged that it could close itself automatically.

Having thus described my invention, I claim as new and desire to secure by Letters Patent—

The pressure-chamber A, provided with piston and rod capable of such adjustment as will cause the piston to yield at any stated degree of pressure, in combination with any suitable valve also capable of similar adjustment, and arranged with relation to such valve and so connected therewith that a certain movement of the pressure-chamber piston-rod will instantaneously open or admit of the immediate self-opening of the valve, substantially as shown and described.

ARTHUR M. BLACK.

Witnesses:
  O. LAPHAM,
  EDWIN METCALF.